United States Patent
Inada

(10) Patent No.: US 6,205,365 B1
(45) Date of Patent: Mar. 20, 2001

(54) METHOD FOR PRODUCTION MANAGEMENT AND PRODUCTION MANAGEMENT SYSTEM USING THE SAME

(75) Inventor: Toshiaki Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/063,398

(22) Filed: Apr. 21, 1998

(30) Foreign Application Priority Data

Dec. 25, 1997 (JP) .................................................. 9-356911

(51) Int. Cl.[7] ...................................................... G06F 19/00
(52) U.S. Cl. ................................................ 700/96; 705/29
(58) Field of Search ............................ 700/96, 100, 101, 700/107, 115, 214, 215, 216, 225, 226, 228, 238; 705/28, 29, 22, 35, 40; 235/385

(56) References Cited

U.S. PATENT DOCUMENTS

| | | | |
|---|---|---|---|
| H1743 | * 8/1998 | Graves et al. | 700/236 |
| 5,063,506 | * 11/1991 | Brockwell et al. | 364/402 |
| 5,311,438 | * 5/1994 | Sellers et al. | 364/468 |
| 5,325,304 | * 6/1994 | Aoki | 364/468 |
| 5,631,827 | * 5/1997 | Nicholls et al. | 705/28 |
| 5,787,402 | * 7/1998 | Potter et al. | 705/37 |
| 5,884,274 | * 3/1999 | Walker et al. | 705/4 |
| 5,983,198 | * 11/1999 | Mowery et al. | 705/22 |
| 6,058,379 | * 5/2000 | Odom et al. | 705/37 |

* cited by examiner

Primary Examiner—Thomas G. Black
Assistant Examiner—Mary D. Wang
(74) Attorney, Agent, or Firm—Staas & Halsey LLP

(57) ABSTRACT

A production management method for ordering parts from a supplier and managing receipt and stock of the parts by use of a computer. The method includes inputting dates on which events related to delivery of the ordered parts take place during a period from the forwarding of the parts by the supplier to the receipt of the parts, as a plurality of delivery event dates, and inputting a base date for management by designating one of the inputted delivery event dates. On the basis of the base date for management, management related to the receipt and stock of the parts is conducted.

7 Claims, 9 Drawing Sheets

FIG. 4

| | | TB1 | |
|---|---|---|---|
| CR | HOME CURRENCY | | THB |
| RN | TERM-BEGINNING EXCHANGE RATE | (US$) | 25.0 |
| RN | TERM-BEGINNING EXCHANGE RATE | (¥) | 0.20 |
| | ............ | | |

| YEAR MONTH DAY | THB ($1) | $ (THB100) RT |
|---|---|---|
| YYYY MM DD | 20.0 | 5.00 |
| YYYY MM DD | 20.5 | 4.88 |
| YYYY MM DD | 20.0 | 5.00 |
| ............ | ............ | ............ |

FIG.6

| | HG1 | |
|---|---|---|
| DR | SUPPLIER | : ○○○ |
| GD | KIND OF TRANSACTION | : EXPORT/IMPORT |
| CU | CURRENCY | : US$ |
| SM | AMOUNT OF MONEY | : 260 |
| DFW | SUPPLIER FORWARDING DATE ① | : YYYY MM DD |
| DSH | PORT-DEPARTURE DATE ② | : YYYY MM DD |
| DAP | PORT-ARRIVAL DATE ③ | : YYYY MM DD |
| DCS | CUSTOMS-CLEARANCE DATE ④ | : YYYY MM DD |
| DRV | RECEIPT DATE ⑤ | : YYYY MM DD |
| DCK | CHECKING DATE ⑥ | : YYYY MM DD |
| DSd | BASIS OF ACCOUNT-PAYABLE OCCURRENCE DATE | ☐ DESIGNATE ONE OF ① TO ⑥ |
| DSe | BASIS OF HOME CURRENCY CONVERTING DATE | ☐ DESIGNATE ONE OF ① TO ⑥ |
| DSm | BASIS OF STOCK MANAGEMENT START DATE | ☐ DESIGNATE ONE OF ① TO ⑥ |

METHOD FOR PRODUCTION MANAGEMENT AND PRODUCTION MANAGEMENT SYSTEM USING THE SAME

CROSS-REFERENCE TO RELATED APPLICATION

This application is related to Japanese application No. HEI 9(1997)-356911 filed on Dec. 25, 1997 whose priority is claimed under 35 USC §119, the disclosure of which is incorporated by reference in its entirety.

BACKGROUND OF THE INVENTION

1. Field of the Invention

The present invention relates to a method for production management and a production management system using the same. The invention also relates to a medium recording a program for the system.

2. Description of Related Art

With growing internationalization of production sites and purchase of parts, there has been demand for a production management system for easily managing export/import of parts and the like and handling specific circumstances different from country to country.

A variety of production management systems for ordering parts to be integrated in products from suppliers and managing receipt and stock of the parts by use of a computer have been conventionally proposed. For example, when a certain part is ordered, the dates of receiving and inspecting the part are checked. The part is treated as stock after the date of its receipt, and stock management is carried out.

The conventional production management systems, however, cannot perform satisfactory management in the case of parts ordered from abroad. In other words, when a part is ordered from a overseas supplier, the ordered part is imported. Owing to a physical distance and procedures to be taken, the part is actually received a long time after the supplier ships the part. For this reason, it is not always proper that the date of receiving the part is set to be a base date from which the part begins to be managed as stock. Further, as to customs duty involved with export/import of parts or products, some countries have their own special practice, which requires proper management.

SUMMARY OF THE INVENTION

The present invention provides a method for production management which is adapted to order parts and properly manage receipt and stock of the parts by use of a computer, a production management system using the method and a medium recording the system program.

According to the present invention, there is provided a production management method for ordering parts from a supplier and managing receipt and stock of the parts by use of a computer. The method comprises inputting dates on which events related to delivery of the ordered parts take place during a period from the forwarding of the parts by the supplier to the receipt of the parts, as a plurality of delivery event dates, and inputting a base date for management by designating one of the inputted delivery event dates, management related to the receipt and stock of the parts being conducted on the basis of the base date for management.

BRIEF DESCRIPTION OF THE DRAWINGS

FIG. 4 shows an exemplary master table of base values in accordance with the present invention;

FIG. 5 shows an exemplary exchange rate table in accordance with the present invention;

FIG. 6 shows an exemplary screen for inputting dates displayed on a screen of a display device in accordance with the present invention;

DESCRIPTION OF THE PREFERRED EMBODIMENTS

Figure 1:
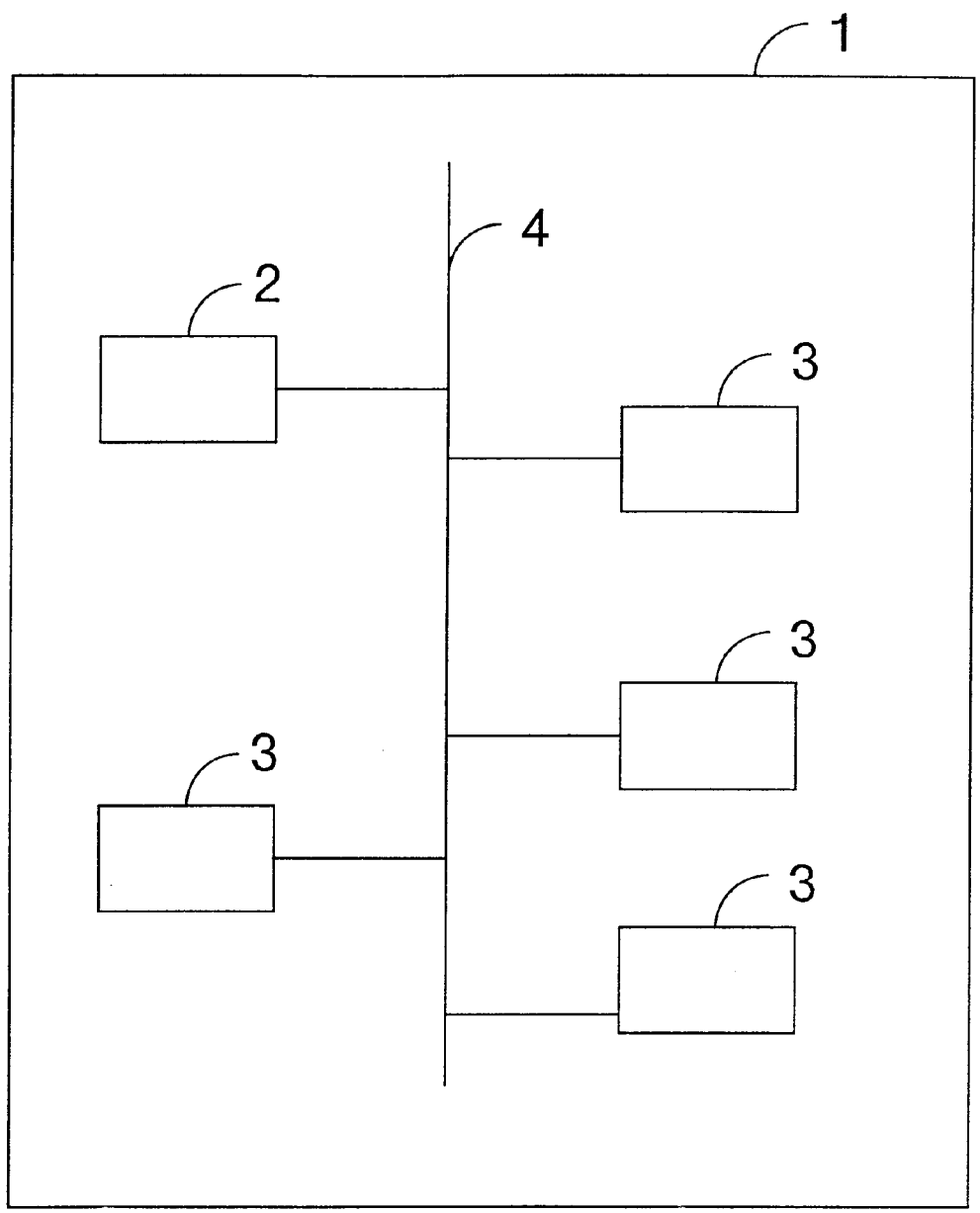
FIG. 1 is a block diagram illustrating the structure of a production management system in accordance with the present invention.

The present invention is now described in detail by way of example by reference to the accompanying drawings, which should not be understood to limit the scope of the invention.

The production management method may further comprise inputting and storing exchange rates of the delivery event dates, reading out an exchange rate of delivery event date which is designated as the base date for management DS, and calculating an amount of money for settlement from the read-out exchange rate.

The production management method may further comprise starting stock management on the inputted base date for management DS.

FIGS. 3 to 7 are block diagrams illustrating the structure of a production management system and a data structure in accordance with the present invention. The production management system of the present invention is a production management system 1 for ordering parts from a supplier located in a foreign country and managing the receipt and inventory of the parts by use of a computer. The system comprises means A2 for acquiring a plurality of dates on which events related to delivery of the ordered parts take place during a period from the forwarding of the parts by the supplier to the receipt of the parts, as a plurality of delivery event dates DC; means A3 for acquiring, as a base date for management DS, a date which is a basis for converting currencies at an exchange rate by designating one of the delivery event dates DC; means A1 for acquiring a transaction currency CU used for transaction of the parts and a transaction amount of money SM in terms of the transaction currency CU; an exchange rate table TB2 storing exchange rates RT of a plurality of dates; and calculation means B11 for calculating an amount of money for settlement TS in terms of a currency for settlement on the basis of the base date for management DS, the transaction currency CU and the transaction amount of money SM by reference to the exchange rate table TB2.

Here, the supplier is supposed to be located abroad, but the invention is also applicable to a case where the supplier is a domestic one which is at a long distance.

The production management system may further comprise a term-beginning rate table TB1 storing an exchange rate RN at the beginning of a term; means for acquiring, as the base date for management DS, a date DSd of occurrence of an account payable; and means B12 for calculating a foreign exchange loss or gain TT on the basis of an exchange rate RT of the date DSd of occurrence of the account payable obtained by reference to the exchange rate table TB2, the exchange rate RN at the beginning of the term obtained from the term-beginning rate table TB1, and the transaction amount of money SM.

The production management system may further comprise means for acquiring, as the base date for management DS, a date DSe for conversion to the currency for settlement; and means for calculating a converted amount of money for the parts on the basis of the transaction amount of money SM and an exchange rate RT on the date DSe for conversion to the currency for settlement obtained by reference to the exchange rate table TB2.

Still further, the production management system of the present invention may be constructed to include means for acquiring, as the base date for management DS, a base date DSm for starting stock management so that the stock management of the parts is started on the base date DSm for starting stock management.

In another aspect of the invention, there is provided a computer readable recording medium usable for ordering parts and managing receipt and stock of the parts by use of a computer. The medium contains thereon a computer program performing the functions of causing a computer operation to display a screen HG1 for inputting dates on which events related to delivery of the ordered parts take place during a period from the forwarding of the parts by a supplier to the receipt of the parts, as a plurality of delivery event dates DC; causing a computer operation to display the inputted delivery event dates DC; and causing a computer operation to input a base date for management DS by designating one of the displayed delivery event dates DC.

The production management system of the present invention may be realized, for example, in the form of a server-client system by means of a personal computer, workstation or the like. A program for performing the method of the present invention is stored in a semiconductor memory, a hard disk, a CD-ROM, a floppy disk, a magneto-optic disk or the like. The program stored in the recording medium is loaded on a main memory and is carried out by a processing device. For this purpose, a drive device such as a CD-ROM drive, a floppy disk drive, a magneto-optic disk drive or the like is used as required. In the case where the recording medium is provided on a sever connected by a communication line such as a network, the program is read or down-loaded from the server via the communication line. In the case where the program is transferred to the processing device via a communication line, the communication line itself is also a recording medium. The program can be supplied which is capable of operating on a variety of OSs and platforms in various system or network environments.

Figure 2:
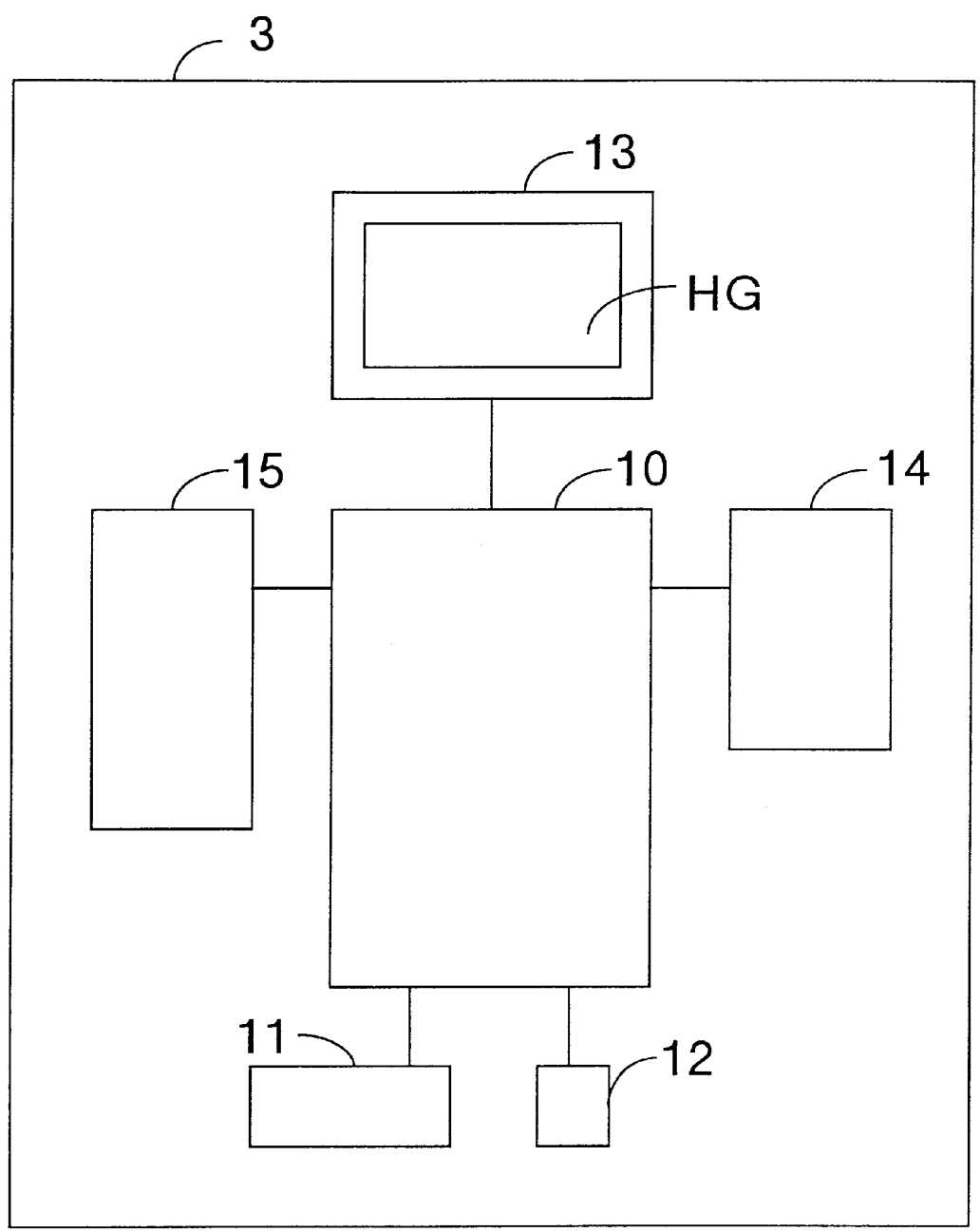
FIG. 2 is a block diagram illustrating the structure of a client in accordance with the present invention.
Figure 3:
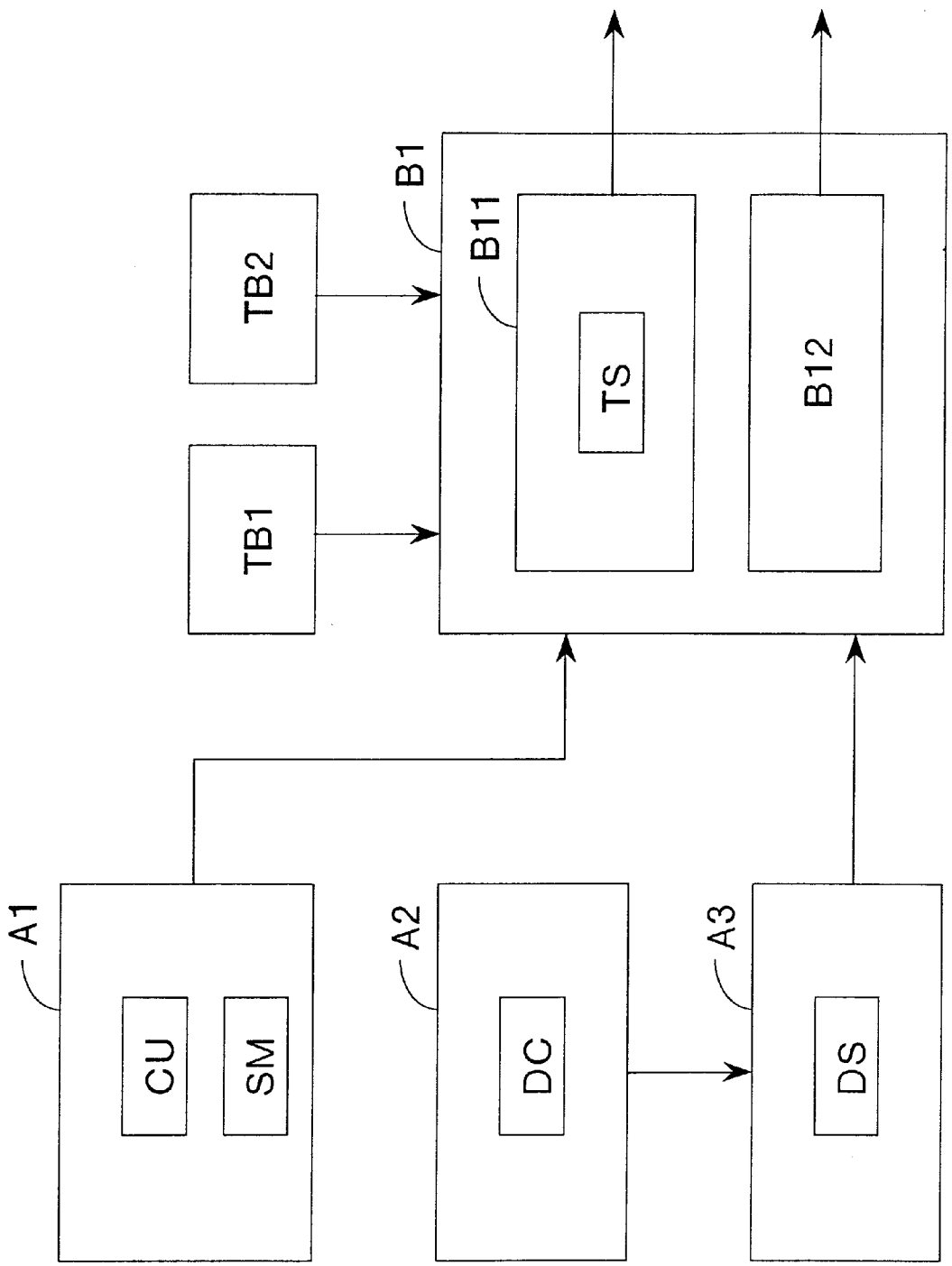
FIG. 3 is a block diagram illustrating a part of the structure of a production management system in accordance with the present invention on a functional basis.

FIG. 1 is a block diagram illustrating the structure of the production management system 1 in accordance with the present invention. FIG. 2 is a block diagram illustrating the structure of a client 3. FIG. 3 is a block diagram illustrating the structure of the production management system 1 on a functional basis. FIG. 4 shows a master table of base values TB1. FIG. 5 shows an exchange rate table TB2.

Referring to FIG. 1, the production management system 1 is comprised of a server 2, a plurality of clients 3 and a network 4. The server 2 stores therein various kinds of tables, data and databases including the base value master table TB1 and the exchange rate table TB2. The server 2 sends out a table stored therein, data in the tables and other data upon instruction from the client 3. The server 2 also stores data sent from the client 3. The client 3 is capable of inputting data and taking data out of the server 2. The client 3 is also capable of displaying various data on a display screen. The server 2 and the client 3 may be constructed of a personal computer or a workstation.

As the network 4, a LAN (local area network) is used in this embodiment, but the Internet, the Intranet and other various networks for personal computer communication can also be used.

Referring to FIG. 2, the client 3 is comprised of a processor 10, a keyboard 11, a mouse 12, a display 13, a printer 14, a memory 15 and the like. As the memory 15, a disk storage, a magneto-optic disk storage, a CD-ROM storage, a floppy disk storage or the like can be used. The memory 15 stores various OSs, various device drivers, an application program for carrying out the production management system of the present invention, other kinds of application programs, data and the like. These programs and data are loaded when required into a main memory of the processor 10 and carried out.

Referring to FIG. 4, the base value master table TB1 is adapted to store various kinds of base values in the production management system 1. In the base value master table TB1, stored are a home currency CR which is used in the production management system 1 and an accounting system in connection with the production management system 1, rates RN at the beginning of a term (referred to as term-beginning rates hereafter) which are used for budgeting, and the like. The term-beginning rates RN are exchange rates of various currencies to the home currency CR which are applicable to the production management system 1. The term-beginning rates RN are updated to the latest ones every term, e.g., every three months, every six months, every year. The term is a period for which a budget is planed and at the end of which all accounts are balanced. The base value master table TB1 corresponds to the term-beginning rate table of the present invention.

Referring to FIG. 5, the exchange rate table TB2 stores exchange rates RT of currencies on a plurality of dates. In the example shown in FIG. 5, the exchange rate table stores the exchange rates RT between Thailand baht (THB) and U.S. dollar, THB and Japanese yen, Japanese yen and U.S. dollar, etc. for the last several months.

Next, it is explained how to input three base dates for management DS in the production management 1.

Figure 7:
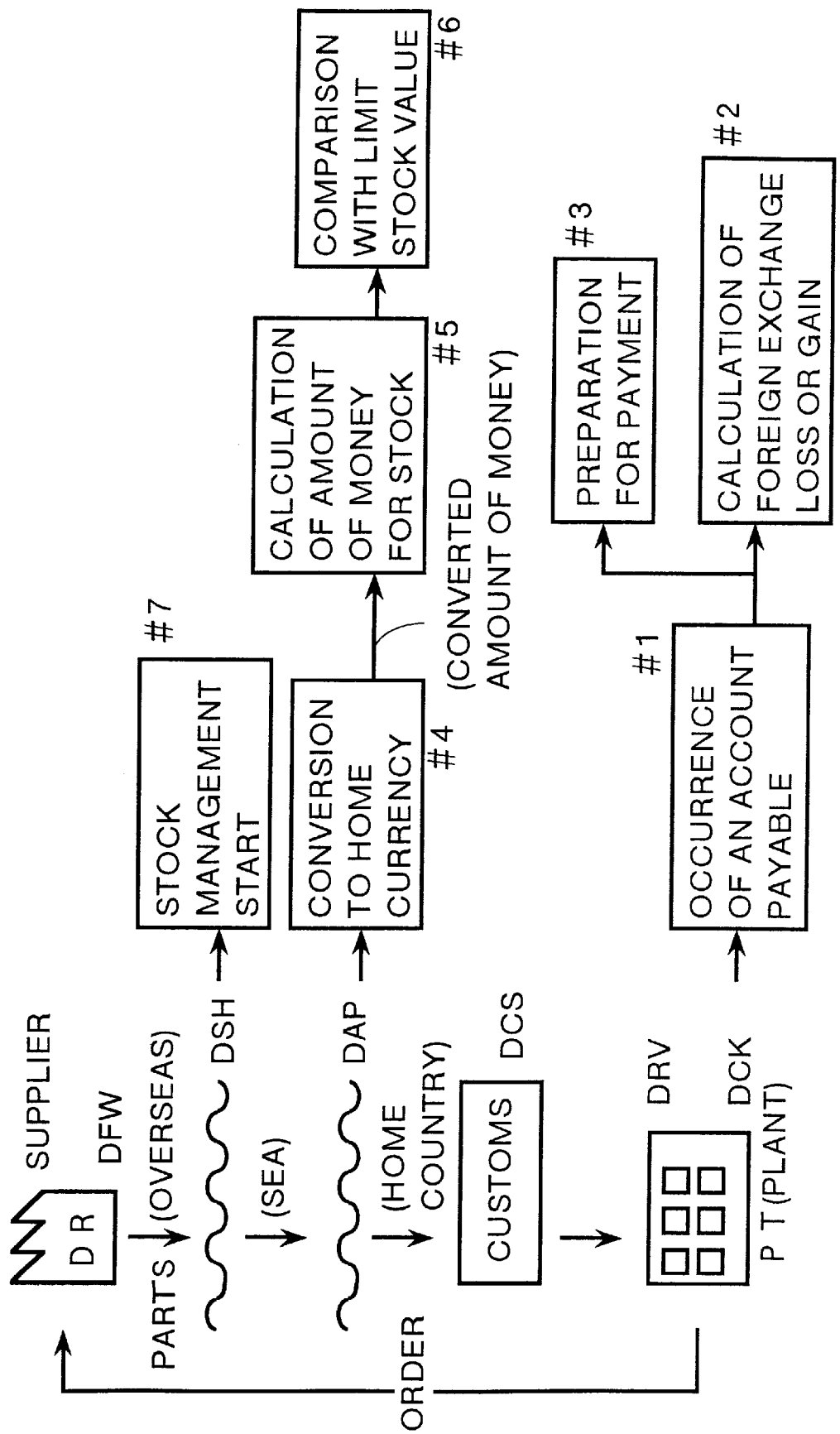
FIG. 7 is a diagram illustrating a delivery route for a part purchased from an overseas supplier.

FIG. 6 shows an exemplary screen for inputting dates (date-input screen HG1) which is displayed on a screen of the display 13. FIG. 7 is a diagram illustrating a delivery route for parts purchased from an overseas supplier DR.

Referring to FIG. 6, displayed on the date-input screen HG1 are input items such as a supplier DR, the kind of transaction GD, a currency CU, an amount of money SM, a date of forwarding by the supplier (supplier forwarding date) DFW, a date of departure from a port in the supplier's country (port-departure date) DSH, a date of arrival in a port in a purchaser's country (port-arrival date) DAP, a date of customs clearance DCS, a date of receipt DRV, a date of checking DCK, a basis of an account payable occurrence date DSd, a basis of a home currency conversion date Dse and a basis of a stock management start date DSm. Of these items, six dates of the supplier forwarding date DFW, the port-departure date DSH, the port-arrival date DAP, the customs-clearance date DCS, the receipt date DRV and the checking date DCK are referred to as "delivery event dates DC," and three dates of the bases of the account payable occurrence date DSd, the basis of the home currency conversion date Dse and the basis of the stock management start date DSm are referred to as "base dates for management DS."

As shown in FIG. 7, the production management system 1 may be provided for a plant or a factory PT or a production management center which may be located in another place. The plant PT, for example, sends parts order to a supplier DR located abroad. The ordered parts are delivered to and received by the plant PT via a delivery route. On the delivery route, several events take place. More particularly, the parts are forwarded by the supplier DR on the supplier forwarding date DFW, and the forwarded parts are then put on a ship. The ship departs from a port in the supplier's country on the port-departure date DSH, and arrives in a port in the home country on the port-arrival date DAP. The parts which passes the customs on the customs-clearance date DCS are received in a storehouse of the plant PT on the receipt date DRV. The received parts are checked in the plant PT, and if they are good, they passes the checking on the checking date DCK.

Here, the events mean those related to production management which actually occur during the process of delivery, including shipment, customs clearance, inspection, etc., for example.

In FIGS. 6 and 7, the currency CU is a currency used in transaction between the plant PT and the supplier DR. In this example, U.S. dollars are used. The amount of money SM is an amount of money payable to the supplier DR for the present transaction and its currency unit is the one inputted in the currency CU item.

An operator of the client 3 inputs the items on the date-input screen HG1 on the basis of information written on vouchers, facsimile letters, order sheets, invoices, etc. In the items of the supplier DR, the kind of transaction GD, the currency CU and the amount of money SM, inputted are those decided when the parts are ordered. As the delivery event dates DC, the actual dates on which the events take place are inputted. The inputted delivery event dates DC are displayed on the screen HG1. The base dates for management DS are inputted by selecting the ones corresponding thereto from the six delivery event dates DC and inputting the numbers of the selected delivery event dates.

Referring to FIG. 6, the checking date DCK is usually used as the basis of the account payable occurrence date DSd. On occurrence of the account payable, the amount of money thereof is fixed (#1), and preparation for payment is started (#3). Regarding the purchase of the parts, there may be a difference between a budget based on the term-beginning rate RN and a settlement amount of money based on the exchange rate RT on the basis of the account payable occurrence date DSd. This difference is calculated as a foreign exchange loss or gain (#2). The sum of foreign exchange losses and gains during a predetermined period of time are calculated and used for accounting management. Additionally, as the basis of the account payable occurrence date DSd, the receipt date DRV or other date may be used.

As the basis of the home currency conversion date DSe, the port-arrival date DAP may be used, for example. Some countries have a customs exemption system for exempting customs for importing parts, provided that the parts are ordered and imported by a plant PT from an overseas supplier DR and all the imported parts are used to be made into products that are all exported abroad; the tax exemption is allowed for parts stored in the plant PT whose value does not exceed a certain limit (this limit is referred to as "limit storage value" in the present specification). In such a case, parts stored in the plant PT must be controlled not to exceed the limit storage value by regularly calculating and checking the value of the parts stored in the plant PT. Since the limit storage value is represented by a currency of the country in which the plant is located, the port-arrival date DAP is used as the basis of the home currency conversion date DSe.

When the basis of the home currency conversion date DSe is inputted, the value of the imported parts is converted into the home currency as import value by calculation by reference to the exchange rate table TB2 (#4). The calculated import value is added to stock value of the parts (#5). The obtained stock value is compared with the limit storage value (#6). Results of the comparison are used for judging how many parts can still be imported and thus for planning the nest purchase of the parts.

The above processes #1 to #6 are executed in the processor 10 of the client 3, but may be executed in the server 2.

As the basis of the stock management start date DSm, used is the port-departure date DSH, for example. Once the parts are forwarded by the supplier DR and leaves the supplier's country, the parts arrives in the plant PT in a due number of days almost certainly. Therefore, the stock management is started from the port-departure date DSH. In this connection, in the case where parts are purchased domestically, the stock management is usually started from the date when the parts actually arrive in the plant. However, in the case where parts are purchased from abroad, it is convenient in some circumstances to start the stock management from the point of time when the receipt of the parts becomes certain before the parts actually arrive.

As described above, the base dates for management DS are not fixed, but can be selected from the delivery event dates DC on an as-needed basis. Therefore, the most suitable dates can be selected as the base dates for management DS depending upon an environment in which the production management system 1 is in operation, state measures of a country in which the plant Pt is located, or the like. Besides, since the input of the base dates for management DS is done by inputting only the numbers of the selected delivery event dates DC instead of punching actual dates, the input is very easy. Therefore, the purchase of parts and the management of parts stock can be properly and easily done with the production management system 1.

Further, not only the production management but also the accounting management or other management can be done at the same time with the production management system 1, for example, the calculation of the foreign exchange loss/gain and the checking of the stock value with respect to the limit storage value.

Figure 8:
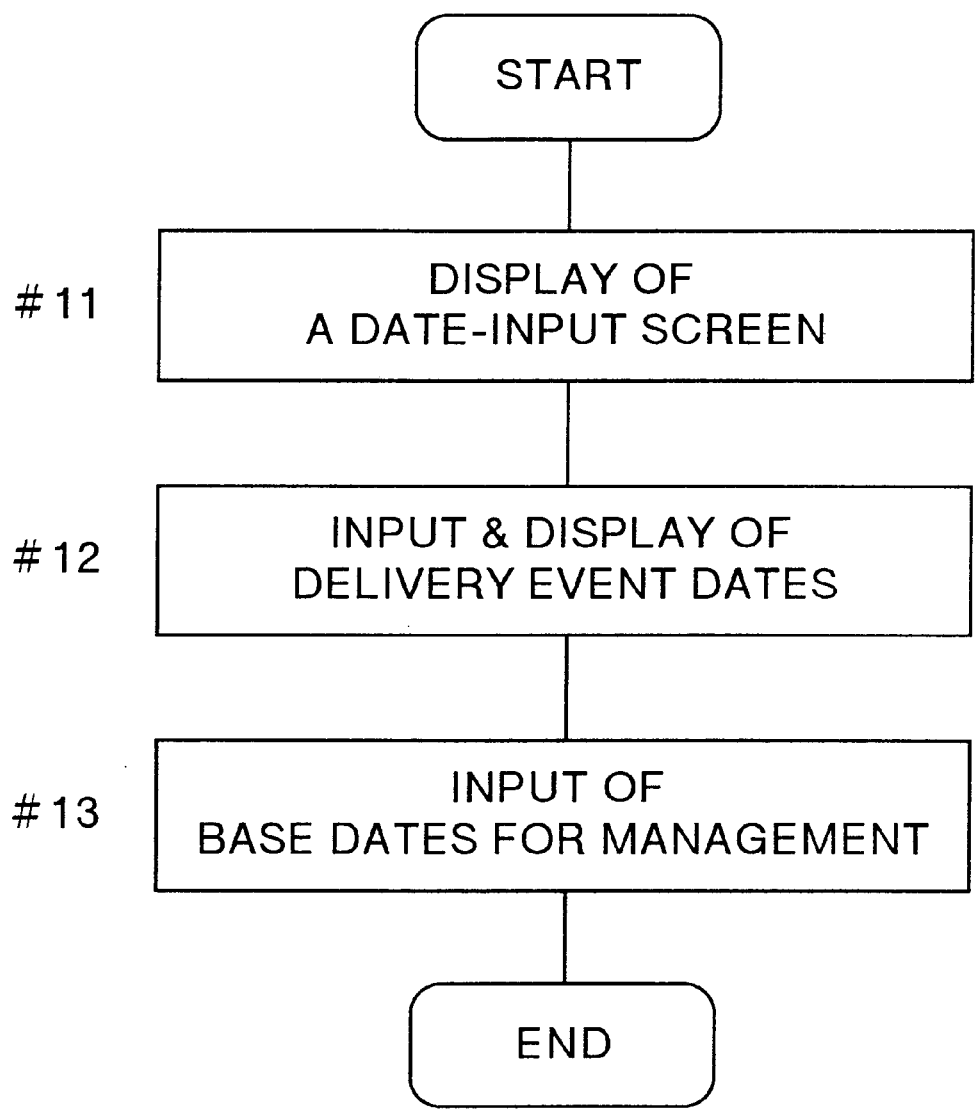
FIG. 8 is a flowchart illustrating processes of an inputting method in accordance with the present invention.

FIG. 8 is a flowchart illustrating processes of an inputting method in accordance with the present invention.

Referring to FIG. 8, the date-input screen HG1 is displayed (#11). On the date-input screen HG1, the delivery event dates DC are inputted and displayed (#12). Then the base date for management DS is inputted by designating one of the delivery event dates DC (#13).

Figure 9:
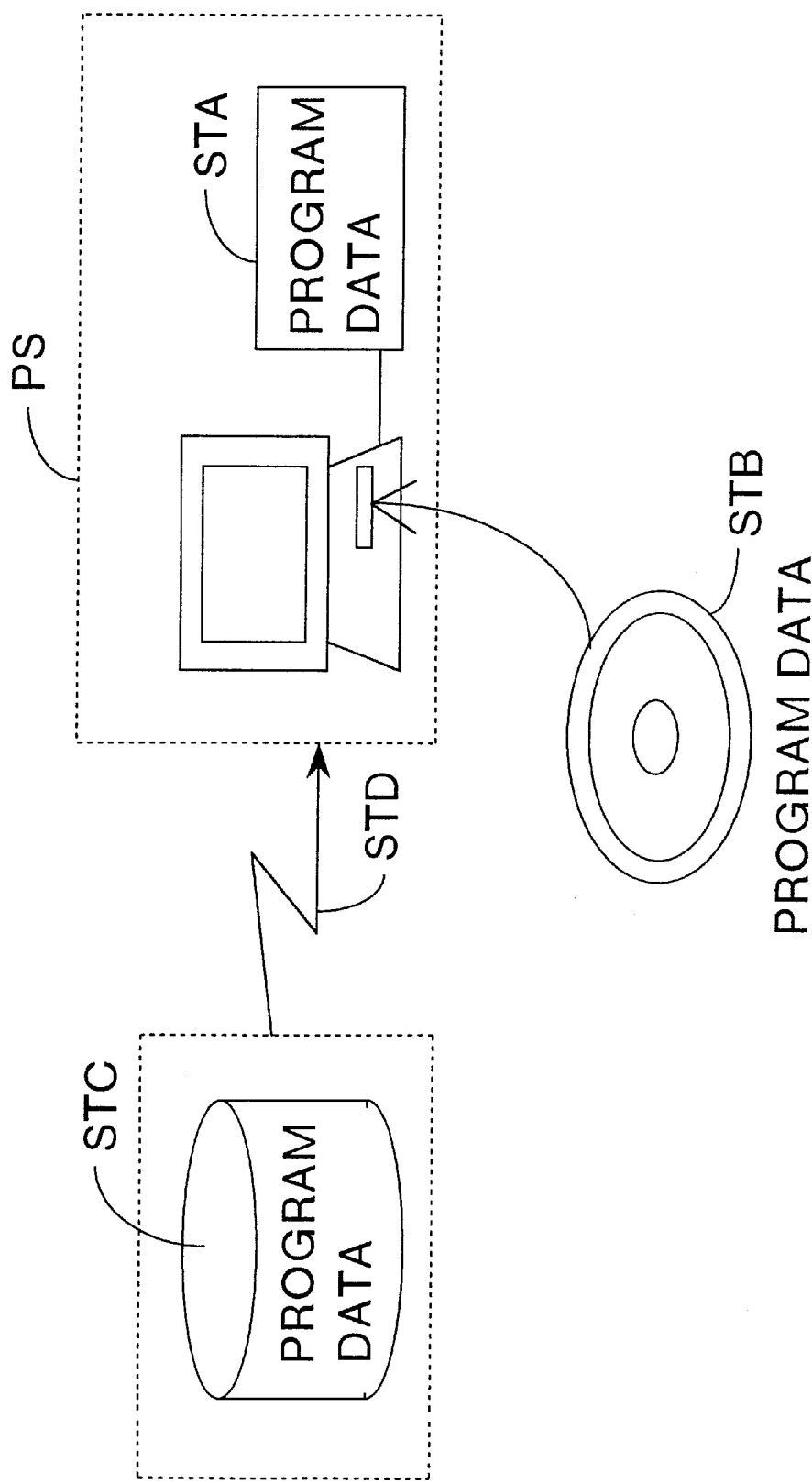
FIG. 9 is a diagram illustrating forms of recording media which record a program for performing the inputting method in accordance with the present invention.

FIG. 9 is a diagram illustrating the form of recording media ST which record a program for performing the method of the present invention.

As shown in FIG. 9, storage devices STA such as a main memory, a RAM, a ROM and a hard disk which are provided for a processing device PS corresponding to the processor 10 of the present invention, transportable media STB such as a CD-ROM, a floppy disk and a magneto-optic disk, media STC connected via a communication line such as a server and a DASD connected via a network or a communication line STD, or the communication line STD itself are usable as recording media ST.

Where the recording medium ST is a transportable medium STB, the program is read by a drive device corresponding to the kind of the transportable medium STB, stored in the storage device STA of the processing device PS or loaded onto the main memory thereof, and executed. Where the recording medium ST is a medium STC connected by a communication line, the program is downloaded or transferred at appropriate times to the storage device STA via the communication line STD, and executed. The program can be supplied as being capable of operating on various OSs and platforms in various system environment or network environment.

In the above described embodiment, the items of the six delivery event dates DC and the three base dates for management DS are displayed and can be inputted on the date-input screen HG1. However, a larger number of delivery event dates DC and base dates for management DS may be displayed for being able to be inputted. Further, for inputting the base dates for management DS, the numbers of the corresponding delivery event dates DC are inputted. However, a plurality of delivery event dates DC may be displayed for each of the base dates for management DS and one of the delivery event dates may be selected by clicking a mouse thereon. The screen layout of the date-input screen HG1, and ways of displaying and of inputting thereon can be changed as required. Some of the items on the date-input screen HG1 may be separated from others, displayed on one or a plurality of screen(s) or window(s) for being able to be inputted. Characters, marks and the like displayed on the date-input screen HG1 may be changed as required.

The delivery event dates DC may be captured by reading bar codes or magnetic ink characters or by transfer via the communication line, instead of inputting on the screen HG1. In the delivery event dates DC displayed on the date-input screen HG1, expected dates of the delivery events may be inputted as expected delivery event dates before actual delivery event dates are inputted.

Further, whole or partial structures of the client 3, the server 2 and the production management system 1, the composition of the tables and data, the content and order of processing, and the content and layout of the screen HG can be changed as required without departing from the spirit and the scope of the present invention.

According to the present invention, since the base date for management is not fixed and can be selected on an as-needed basis from the delivery event dates, the optimum date can be chosen depending upon circumstances under which the invention is in operation, policy of a related country and the like. Further, since the base date for management is inputted by designating one of the delivery event dates but not by punching the actual date, the input thereof can easily be done. Therefore, the order of parts from an overseas supplier, the receipt of the parts and the stock of the parts can be properly managed by use of a computer. Further, not only the stock management but also the checking of the stock value with respect to the limit storage value and the checking of the foreign exchange loss/profit can be carried out at the same time.

What is claimed is:

1. A production management method for ordering parts from a supplier and managing receipt and stock of parts by use of a computer, the method comprising:

inputting dates on which events related to delivery of the ordered parts take place during a period from the forwarding of the parts by the supplier to the receipt of the parts, as a plurality of delivery event dates;

inputting a base date for management by designating one of the inputted delivery event dates, management related to the receipt and stock of the parts being conducted on the basis of the base date for management; and inputting and storing exchange rates of the delivery event dates, reading out an exchange rate of a delivery event date which is designated as the base date for management, and calculating an amount of money for settlement from the read-out exchange rate.

2. A production management system for ordering parts from a supplier and managing receipt and stock of the parts by use of a computer, the system comprising:

means for acquiring a plurality of dates on which events related to delivery of the ordered parts take place during a period from the forwarding of the parts by the supplier to the receipt of the parts, as a plurality of delivery event dates;

means for acquiring, as a base date for management, a date which is a base for converting currencies at an exchange rate by designating one of the delivery event dates;

means for acquiring a transaction currency used for transaction of the parts and a transaction amount of money in terms of the transaction currency;

an exchange rate table storing exchange rates of a plurality of dates; and calculation means for calculating an amount of money for settlement in terms of a currency for settlement on the basis of the base date for management, the transaction currency and the transaction amount of money by reference to the exchange rate table.

3. A production management system according to claim 2 further comprising:

a term-beginning rate table storing an exchange rate at the beginning of a term;

means for acquiring, as the base date for management, a date of occurrence of an account payable; and means for calculating a foreign exchange loss or gain on the basis of an exchange rate of the date of occurrence of the account payable obtained by reference to the exchange rate table, the exchange rate at the beginning of the term obtained from the term-beginning rate table, and the transaction amount of money.

4. A production management system according to claim 3 further comprising:

means for acquiring, as the base date for management, a date for conversion to the currency for settlement; and means for calculating a converted amount of money for the parts on the basis of the transaction amount of money and an exchange rate of the date for conversion to the currency for settlement obtained by reference to the exchange rate table.

5. A production management system according to any of claim 2 further comprising means for acquiring, as the base date for management, a base date for starting stock management, wherein the stock management of the parts is started on the base date for starting stock management.

6. A computer readable recording medium usable for ordering parts and managing receipt and stock of the parts by use of a computer, the medium containing thereon a computer program performing the functions of:

causing a computer operation to display a screen for inputting dates on which events related to delivery of the ordered parts take place during a period from the forwarding of the parts by a supplier to the receipt of the parts, as a plurality of delivery event dates;

causing a computer operation to display the inputted delivery event dates;

causing a computer operation to input a base date for management by designating one of the displayed delivery event dates;

causing a computer operation to display a screen for inputting a transaction currency used for transaction of the parts and a transaction amount of money in terms of the transaction currency;

causing a computer operation to calculate an amount of money for settlement in terms of a currency for settlement on the basis of the base date for management, the transaction currency and the transaction amount of money by reference to an exchange rate table storing exchange rates of a plurality of dates; and causing a computer operation to display the calculated amount of money for settlement.

7. A production management system ordering parts from a supplier and managing receipt and stock of the parts by use of a computer, the system comprising:

a delivery date unit acquiring dates on which events related to delivery of ordered parts take place during a period from the forwarding of the parts by the supplier to the receipt of the parts, as delivery event dates;

a base date unit in communication with the delivery date unit and acquiring, as a base date for management, a date which is a base for converting currencies at an exchange rate by designating one of the delivery event dates;

a transaction currency unit acquiring a transaction currency used for transaction of the parts and a transaction amount of money in terms of the transaction currency;

an exchange rate table storing exchange rates of dates; and a calculation unit in communication with the transaction currency unit, the base date unit and the exchange rate table and calculating an amount of money for settlement in terms of a currency for settlement on the basis of the base date for management, the transaction currency and the transaction amount of money by reference to the exchange rate table.

* * * * *